US005464672A

United States Patent [19]

Jackson

[11] Patent Number: 5,464,672

[45] Date of Patent: Nov. 7, 1995

[54] NOTE PAD

[76] Inventor: Kathleen M. Jackson, 111 Prospect St., Stamford, Conn. 06901

[21] Appl. No.: 334,055

[22] Filed: Nov. 4, 1994

[51] Int. Cl.[6] .......... C09J 7/04

[52] U.S. Cl. .......... 428/40; 428/80; 428/84; 462/901

[58] Field of Search .......... 428/40, 80, 84; 462/901

[56] References Cited

U.S. PATENT DOCUMENTS

| | | | |
|---|---|---|---|
| 5,153,041 | 10/1992 | Clements | 428/40 |
| 5,238,271 | 8/1993 | Nirmel | 428/40 |
| 5,286,546 | 2/1994 | Su | 428/40 |
| 5,318,825 | 6/1994 | Naber | 428/40 |
| 5,366,776 | 11/1994 | Mertens | 428/40 |

*Primary Examiner*—Jenna L. Davis
*Attorney, Agent, or Firm*—Edward R. Hyde

[57] ABSTRACT

A note pad of repositionable adhesive sheets in whcih one edge has an irregular design to facilitate removal of individual sheets from the pad.

1 Claim, 1 Drawing Sheet

NOTE PAD

BACKGROUND OF THE INVENTION

1. Field of the Invention

The present invention relates to a note pad and particularly the type of pads having sheets of repositionable adhesive on a portion of each sheet so that it can be removed from the pad and secured to another surface. Such pads in general are manufactured, for example, by the 3M Company under the trademark of "Post-It Notes". The pad is conventionally provided with individual sheets, each of which has a border on the back surface thereof, having repositionable adhesive so a removed sheet can be applied to another surface.

2. Description of the Prior Art

The pads with repositionable sheets of the prior art are well known and are conventionally of rectangular shape and come in a variety of sizes and colors. A user will make a pen or pencil notation on the upper sheet which is then removed and placed upon some other surface such as a file or other sheet of paper.

Because the sheets of the pad are square cut, it sometimes occurs that when a sheet is removed a plurality of sheets are torn off from the pad. This is a disadvantage of the prior art and one of the problems to which the present invention is directed.

SUMMARY OF THE INVENTION

An object of the present invention is to provide a pad of repositionable adhesive sheets in which the removal of individual sheets is facilitated.

Another object of the present invention is to provide a repositionable sheet pad in which individual sheets may be readily and conveniently removed.

A still further object of the present invention is to provide a pad of repositionable adhesive sheets that is attractive and aesthetically pleasing.

Accordingly the present invention provides a pad of sheets in which the edge of each sheet, remote from the tear off edge, is of irregular contour so that each sheet may be readily grasped individually and separately from the sheet below it. The irregular contour of the bottom edge of each sheet is in the form of filigree or lace pattern which comprises an ornamental open work of lace like design.

It has been found that a pad with irregular lace like edging at the bottom edge permits convenient separation of individual pages of the pad. The sheets are removable from the pad and each contains a non-dry adhesive so that the sheet can be secured to another surface.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein which.

DESCRIPTION OF THE PREFERRED EMBODIMENT

Figure 1:
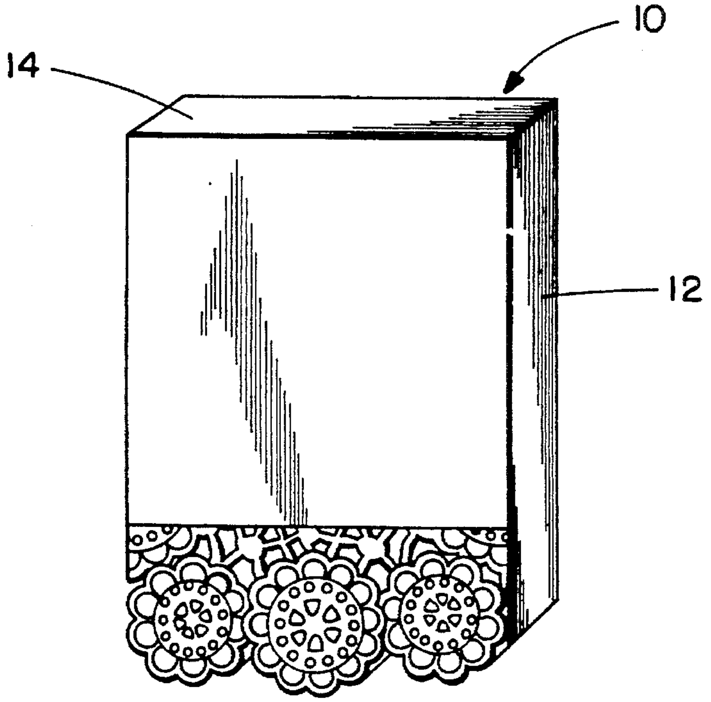
FIG. 1 is a prospective view of a pad of sheets of the present invention.
Figure 2:
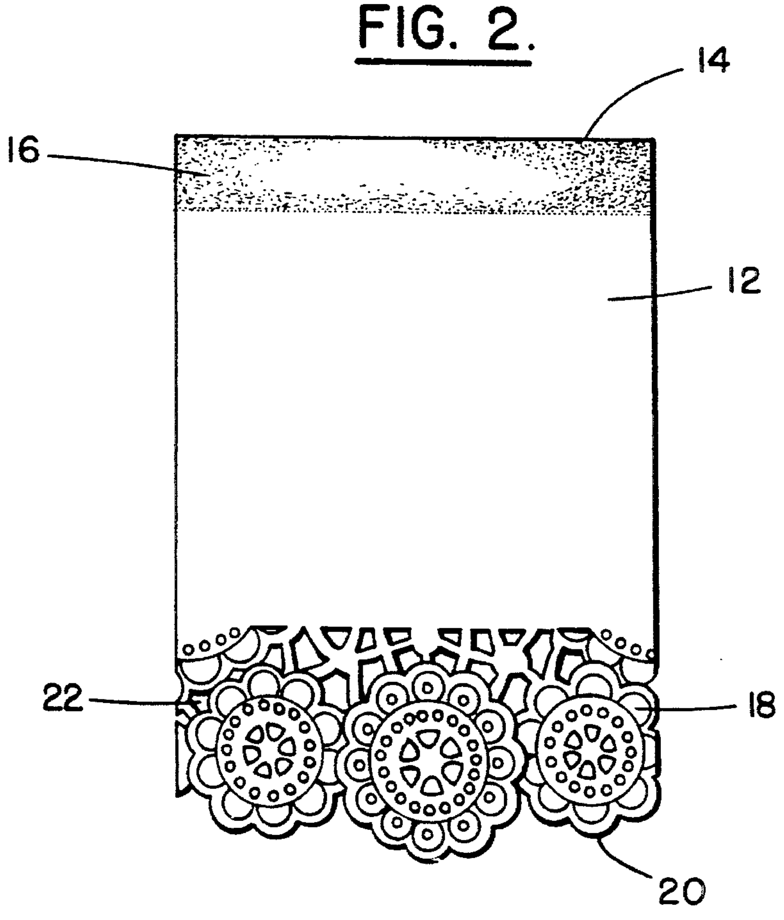
FIG. 2 is a plan view of the back of an individual sheet.

Referring now to the drawings, 10 indicates a pad of repositionable sheets of the present invention. The pad comprises a stack of individual sheets 12 that are of substantially the same size and may be of rectangular shape. One edge of each sheet which is shown as the upper edge in the figures is coated with an adhesive 14 which permits the sheets to be reasonably bound to each other to form a pad as is well known in the art. The back surface of each sheet has a border of repositionable adhesive 16 which extends substantially the entire width of the back surface of each sheet and is a type of adhesive that is also known in the art. As is well understood, when a sheet 12 is removed from the pad it can be located on a different surface because the adhesive 16 is of a non-dry type and will adhere to other surfaces after it is removed from its pad.

The novel feature of the present invention is that each sheet 12 has a lace like or filigree design 18 along the edge remote from the adhesive edge. The design terminates in an edge 20 that is irregular in contour, and it is this that aids in faciliting the removable of individual sheets. The lace like edge border 18 extends upward from the edge 20 and preferably includes open areas 22 to form the border that is pleasing and attractive to the eye. Thus, the border 18 with its open filigree, lace like network, serves to permit readily and easily removal of individual sheets while providing an attractive appearance to those who use the pad. Although the lace like irregular border facilitates sheet removal without openings, the open design is preferable.

Having thus described the invention with particular reference to the preferred forms thereof, it will be obvious that various changes and modifications may be made therein without departing from the spirit and scope of the invention as defined in the appended claims.

What is claimed is:

1. A note pad comprising a plurality of paper sheets stacked to form a pad;

an adhesive on corresponding first edges of the plurality of sheets to releasably bind the pad of sheets;

repositionable adhesive located along a border of each sheet adjacent the first edge thereof, whereby each sheet may be removed from the pad and secured to a surface; and the border along the edge of each sheet opposite the said first edge thereof having a filigree design to facilitate the removal of each sheet from the pad.

* * * * *